US012689468B2

(12) United States Patent
Bioglio et al.

(10) Patent No.: US 12,689,468 B2
(45) Date of Patent: Jul. 21, 2026

(54) APPARATUS AND METHOD FOR RANDOM LINEAR CODE ENCODING AND GUESSING RANDOM ADDITIVE NOISE DECODING (GRAND)

(71) Applicant: Huawei Technologies Co., Ltd., Shenzhen (CN)

(72) Inventors: Valerio Bioglio, Munich (DE); Ingmar Land, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/884,753

(22) Filed: Sep. 13, 2024

(65) Prior Publication Data

US 2025/0007650 A1　Jan. 2, 2025

Related U.S. Application Data

(63) Continuation of application No. PCT/EP2022/056437, filed on Mar. 14, 2022.

(51) Int. Cl.
H04L 1/00 (2006.01)

(52) U.S. Cl.
CPC .......... H04L 1/0071 (2013.01); H04L 1/0041 (2013.01); H04L 1/0045 (2013.01)

(58) Field of Classification Search
None
See application file for complete search history.

(56) References Cited

U.S. PATENT DOCUMENTS 6,745,362 B1　6/2004　Carlach et al.
8,095,859 B1 *　1/2012　Peterson .............. H03M 13/611
　　　　　　　　　　　　　　　　714/801
2012/0057648 A1　3/2012　Perez Chamorro et al.

OTHER PUBLICATIONS

Patrick Adde et al, "Design of an Efficient Maximum Likelihood Soft Decoder for Systematic Short Block Codes", IEEE Transactions on Signal Processing, vol. 60, No. 7, Jul. 2012, XP011454875, total 5 pages.
Ken R. Duffy et al, "Capacity-Achieving Guessing Random Additive Noise Decoding", IEEE Transactions on Information Theory, vol. 65, No. 7, Jul. 2019 , total 18 pages.
J .C. Carlach et al, "A new scheme for building good self-dual block codes", ISIT 2000, Sorrento, Italy, Jun. 25-30, 2000, XP010510349, total 1 page.

(Continued)

*Primary Examiner* — Guerrier Merant
(74) *Attorney, Agent, or Firm* — Slater Matsil, LLP

(57) ABSTRACT

An apparatus for encoding an information word of size N into a codeword includes a processing unit to initialize a current vector as being the information word and run T times, T being a predetermined integer greater or equal to 1, a loop. The loop includes generating a scrambled vector by interleaving values of the current vector, grouping values of the scrambled vector into N/m input vectors of size m, and multiplying each of the input vectors by an encoding matrix of size m×m to obtain output vectors. The loop further includes setting the current vector with a concatenation of the output vectors. Moreover, the apparatus includes a transmitting unit configured to transmit the codeword through a communication channel, the codeword being the last current vector in the loop.

20 Claims, 7 Drawing Sheets

(56)         References Cited

OTHER PUBLICATIONS

Ken R. Duffy et al, "Guessing random additive noise decoding with soft detection symbol reliability information (SGRAND)", arXiv:1902.03796v1 [cs.IT] Feb. 11, 2019, total 15 pages.

G.Olocco et al, "A family of self-dual codes which behave in many respects like random linear codes of rate", ISIT2001, Washington, DC, Jun. 24-29, 2001, XP002541519, total 1 page.

Amit Solomon et al, "Soft Maximum Likelihood Decoding using GRAND", arXiv:2001.03089v1 [cs.IT] Jan. 9, 2020, total 6 pages.

3GPP TSG RAN WG1 Meeting #87, R1-1611254, "Details of the polar code design", Huawei, HiSilicon, Reno, USA, Nov. 10-14, 2016, XP051175235, total 15 pages.

Ken R. Duffy et al, "Ordered Reliability Bits Guessing Random Additive Noise Decoding", arXiv:2001.00546v1 [cs.IT] Jan. 2, 2020, total 6 pages.

Cédric Marchand et al , "Design and implementation of a near maximum likelihood decoder for Cortex codes", Aug. 27, 2012, XP032456358, total 5 pages.

Samuel J. Macmullan et al, "A Comparison of Known Codes, Random Codes, and the Best Codes", IEEE Transactions on Information Theory, vol. 44, No. 7, Nov. 1998, total 14 pages.

Patrick Adde et al, "Design and implementation of a soft-decision decoder for Cortex codes", Dec. 12, 2010, XP031923047, total 5 pages.

Alexander May et al, "Decoding Random Linear Codes in O(20. 054n)", in International Conference on the Theory and Application of Cryptology and Information Security (ASIACRYPT), Seoul, South Korea, Dec. 2011, total 18 pages.

Erdal Arikan et al, "Channel polarization: A method for constructing capacity-achieving codes for symmetric binary-input memoryless channels", arXiv:0807.3917v5 [cs.IT] Jul. 20, 2009, total 23 pages.

Wafaa S. Sayed et al, "Design of Positive, Negative, and Alternating Sign Generalized Logistic Maps", Hindawi Publishing Corporation Discrete Dynamics in Nature and Society vol. 2015, Article ID 586783, total 24 pages.

Valerio Bioglio et al, "Design of Polar Codes in 5G New Radio", arXiv:1804.04389v3 [cs.IT] Jan. 6, 2020, total 12 pages.

Riaz Arslan et al., "A Universal Maximum Likelihood GRAND Decoder in 40nm CMOS", Proc., IEEE 14th International Conference on Communication Systems and Networks (COMSNETS), Jan. 4, 2022, total 3 pages.

* cited by examiner

300

INITIALIZING CURRENT VECTOR AS BEING INFORMATION WORD (u)
302

RUNNING T TIMES, WITH T BEING PREDETERMINED AND GREATER OR
EQUAL TO 1, LOOP 304

GENERATING SCRAMBLED VECTOR BY INTERLEAVING VALUES
OF CURRENT VECTOR 304A

GROUPING VALUES OF SCRAMBLED VECTOR INTO N / m INPUT
VECTORS OF SIZE m, WITH m ≥ 2 AND m DIVIDES N 304B

MULTIPLYING EACH OF INPUT VECTORS BY ENCODING MATRIX
OF SIZE m x m TO OBTAIN OUTPUT VECTORS 304C

SETTING CURRENT VECTOR WITH CONCATENATION OF OUTPUT
VECTORS 304D

TRANSMITTING CODEWORD THROUGH COMMUNICATION CHANNEL
BEING LAST CURRENT VECTOR IN LOOP 306

FIG. 3

500

GENERATING CANDIDATE CODEWORD BY ADDING ERROR VECTOR TO HARD DECISION VECTOR 502

INITIALIZING CURRENT CODEWORD AS BEING CANDIDATE CODEWORD, AND RUNNING T TIMES, WITH T BEING PREDETERMINED AND GREATER OR EQUAL TO 1, BACKWARD ENCODING LOOP 504

GROUPING VALUES OF CURRENT CODEWORD INTO N / m INPUT VECTORS OF SIZE m, WITH m≥ 2 AND m DIVIDES N 504A

MULTIPLYING EACH OF INPUT VECTORS BY DECODING MATRIX OF SIZE m x m TO OBTAIN OUTPUT VECTORS, AND CONCATENATING OBTAINED OUTPUT VECTORS 504B

GENERATING SCRAMBLED VECTOR BY INTERLEAVING VALUES OF CONCATENATED OUTPUT VECTORS 504C

SETTING CURRENT CODEWORD AS BEING SCRAMBLED VECTOR 504D

CHECKING ENTRIES IN LAST CURRENT CODEWORD IN BACKWARD ENCODING LOOP OUTSIDE OF INFORMATION SET, AND IF AT LEAST ONE OF SAID ENTRIES IS NOT ZERO, CHANGING ERROR VECTOR AND STARTING RUNNING FURTHER DECODING LOOP WITH CHANGED ERROR VECTOR, OTHERWISE, STOPPING DECODING LOOP AND SETTING DECODED CODEWORD AS BEING LAST CURRENT CODEWORD IN BACKWARD ENCODING LOOP 506

FIG. 5

APPARATUS AND METHOD FOR RANDOM LINEAR CODE ENCODING AND GUESSING RANDOM ADDITIVE NOISE DECODING (GRAND)

CROSS-REFERENCE TO RELATED APPLICATIONS

This application is a continuation of International Application No. PCT/EP2022/056437, filed on Mar. 14, 2022, the disclosure of which is hereby incorporated by reference in its entirety.

TECHNICAL FIELD

The present disclosure relates generally to the field of digital communications and more specifically, to an apparatus and method for random linear code encoding.

BACKGROUND

Generally, channel codes are essential in all digital communications systems. A digital communication system for forward error correction (FEC) coding, such as a coding scheme, consists of an encoder at a transmitter and a decoder at a receiver. Conventionally, the encoder adds redundancy to data to be transmitted, such as adding additional redundant data. Moreover, the decoder exploits the redundancy to correct transmission errors, such that the receiver obtains the transmitted data without errors despite a noisy communication channel. Conventionally, the data to be transmitted is termed as an information word and is given to the encoder that produces a codeword, which contains redundancy. The codeword is then transmitted over the noisy communication channel that typically introduces errors, which is not desirable. After that, the output of the noisy communication channel is provided to the decoder along with errors, and the decoder generally produces estimates of the transmitted codeword and the transmitted data.

Conventionally, certain attempts have been made to remove errors, such as by using a maximum likelihood (ML) decoder for any error-correcting code. In general, the ML decoder should compare the received output with all the codewords in a codebook generated by the error-correcting code, and select the one closest to the received output, for which the error probability is minimized. However, the ML decoder is highly complex, due to which it is impractical for the decoding of many codewords. In certain scenarios, Guessing Random Additive Noise Decoders (GRAND) have been proposed as an alternative to state-of-the-art to perform ML decoding. However, in such scenarios, encoding and codeword checks are performed through matrix multiplication, which can be demanding in hardware. Moreover, codeword check is not tailored for decoding in the GRAND and requires performing operation multiple times during decoding, thus time-consuming. In addition, in such scenarios, encoding and codeword check is based on binary matrix multiplication, which results in an increased encoding and decoding latency due to matrix multiplication operations. Therefore, there exists a technical problem of how to limit encoding and decoding latency for GRAND-based encoders and decoders.

Therefore, in light of the foregoing discussion, there exists a need to overcome the aforementioned drawbacks associated with the conventional encoders and decoders.

SUMMARY

The present disclosure provides an apparatus and methods for random linear code encoding. The present disclosure provides a solution to the existing problem of how to limit encoding and decoding latency for GRAND-based encoders and decoders. An objective of the present disclosure is to provide a solution that overcomes at least partially the problems encountered in the prior art and provides an improved apparatus and improved methods for random linear code encoding for Guessing Random Additive Noise Decoders (GRAND).

One or more objectives of the present disclosure is achieved by the solutions provided in the enclosed independent claims. Advantageous implementations of the present disclosure are further defined in the dependent claims.

In one aspect, the present disclosure provides an apparatus for encoding an information word (u) of size N into a codeword (x), the apparatus includes a processing unit configured to initialize a current vector as being the information word (u), and run T times, T being a predetermined integer greater or equal to 1, a loop. The loop includes generating a scrambled vector by interleaving values of the current vector, grouping values of the scrambled vector into N/m input vectors of size m, where $m \geq 2$ and m divides N, and multiplying each of the input vectors by an encoding matrix of size m×m to obtain output vectors, and setting the current vector with a concatenation of the output vectors, and a transmitting unit configured to transmit the codeword (x) through a communication channel, the codeword (x) being the last current vector in the loop.

The apparatus is beneficial for random linear coding (RLC) of the information word (u) of size N into the codeword (x) while reducing the encoding latency. The apparatus further permits the creation of RLC codes with limited encoding latency, while providing a simple check function for Guessing Random Additive Noise Decoders (GRAND). In an implementation, the apparatus for RLC of the information word (u) outcome state-of-the-art codes for wireless communication, and approaches improved performance with improved polar code.

In a further implementation form, the encoding matrix is an invertible binary matrix.

The invertible binary matrix is beneficial to perform parallel encoding.

In a further implementation form, the encoding matrix is an involutive matrix.

In such implementation, an inverse of the encoding matrix is equivalent to the encoding matrix presented at an encoder of the apparatus.

In a further implementation form, the encoding matrix is the 2×2 polar kernel $$\begin{bmatrix} 1 & 0 \\ 1 & 1 \end{bmatrix}.$$

The 2×2 polar kernel is beneficial to find an optimal value of T, so as to reduce encoding redundancy of the apparatus.

In another aspect, the present disclosure further provides a method for encoding an information word (u) of size N into a codeword (x) to be transmitted through a communication channel. The method includes initializing a current vector as being the information word (u), and running T times, with T being predetermined and greater or equal to 1. The method includes a loop comprising generating a scrambled vector by interleaving the values of the current vector, grouping the values of the scrambled vector into N/m input vectors of size m, with $m \geq 2$ and m divides N, multiplying each of the input vectors by an encoding matrix of size m×m to obtain output vectors, and setting the current vector with the concatenation of the output vectors, the codeword (x) to be transmitted through the communication channel being the last current vector in the loop.

The disclosed method achieves all the advantages and technical features of the apparatus of the present disclosure.

In yet another aspect, the present disclosure further provides an apparatus for decoding a symbol vector (y) received through a communication channel into a decoded codeword (x) of size N associated with an information set of size K, with K<N. The apparatus comprising a processing unit configured to extract a hard decision vector from the symbol vector, to initialize an error vector, and to run a decoding loop comprises generating a candidate codeword by adding the error vector to the hard decision vector. The decoding loop further comprises initializing a current codeword as being the candidate codeword, and running T times, with T being predetermined and greater or equal to 1, a backward encoding loop comprising grouping the values of the current codeword into N/m input vectors of size m, with m≥2 and m divides N. The backward encoding loop comprises multiplying each of the input vectors by a decoding matrix of size m×m to obtain output vectors, and concatenating the obtained output vectors, generating a scrambled vector by interleaving the values of the concatenated output vectors, and setting the current codeword as being the scrambled vector. The apparatus further includes checking the entries in the last current codeword in the backward encoding loop outside of the information set, and if at least one of said entries is not zero, changing the error vector and starting running further the decoding loop with the changed error vector, otherwise, stopping the decoding loop and setting the decoded codeword (x) as being the last current codeword in the backward encoding loop.

The apparatus is beneficial for decoding a symbol vector (y) received through a communication channel into a decoded codeword (x) of size N while reducing the decoding latency. The apparatus further permits the creation of RLC codes with limited decoding latency, while providing a simple check function for Guessing Random Additive Noise Decoders (GRAND).

In another aspect, the present disclosure further provides a method for decoding a symbol vector (y) received through a communication channel into a decoded codeword (x) of size N associated with an information set of size K, with K<N, the method comprising extracting a hard decision vector from the symbol vector, initializing an error vector, and running a decoding loop comprising generating a candidate codeword by adding the error vector to the hard decision vector. The decoding loop further comprising initializing a current codeword as being the candidate codeword, and running T times, with T being predetermined and greater or equal to 1, a backward encoding loop comprising grouping the values of the current codeword into N/m input vectors of size m, with m≥2 and m divides N. The backward encoding loop multiplying each of the input vectors by a decoding matrix of size m×m to obtain output vectors, and concatenating the obtained output vectors, generating a scrambled vector by interleaving the values of the concat-enated output vectors, and setting the current codeword as being the scrambled vector. The method further comprising checking the entries in the last current codeword in the backward encoding loop outside of the information set, and if at least one of said entries is not zero, changing the error vector and starting running further the decoding loop with the changed error vector, otherwise, stopping the decoding loop and setting the decoded codeword (x) as being the last current codeword in the backward encoding loop.

The method is beneficial for decoding a symbol vector (y) received through a communication channel into a decoded codeword (x) of size N while reducing the decoding latency. The method further permits the creation of RLC codes with limited decoding latency, while providing a simple check function for Guessing Random Additive Noise Decoders (GRAND).

It is to be appreciated that all the aforementioned implementation forms can be combined.

It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3 is a flowchart of a method for encoding an information word (u) of size N into a codeword (x), in accordance with an embodiment of the present disclosure;

FIG. 5 is a flowchart of a method for decoding a symbol vector (y) received through a communication channel into a decoded codeword (x), in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE
EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
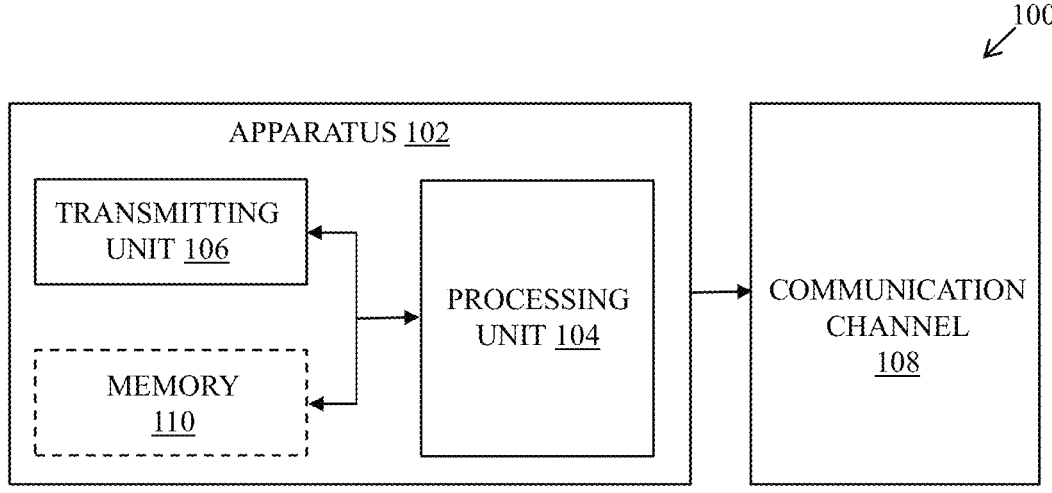
FIG. 1 is a block diagram of an apparatus for encoding an information word (u) of size N into a codeword (x), in accordance with an embodiment of the present disclosure.

FIG. 1 is a block diagram of an apparatus for encoding an information word (u) of size N into a codeword (x), in accordance with an embodiment of the present disclosure. With reference to FIG. 1, there is shown an apparatus 102 for encoding an information word (u) of size N into a codeword (x). The apparatus 102 includes a processing unit 104, and a transmitting unit 106. There is further shown a communication channel 108, and a memory 110.

The apparatus 102 is used to encode the information word (u) of size N into the codeword (x). The apparatus 102 is used to generate random linear codes (RLC) encoding for Guessing Random Additive Noise Decoders (GRAND), and the RLC encoding is not systematic. In an implementation, the apparatus 102 may also be referred to as an encoder.

The processing unit 104 may include suitable logic, circuitry, interfaces, and/or code that are configured to initialize a current vector as being the information word (u). Examples of implementation of the processing unit 104 may include but are not limited to a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry.

The transmitting unit 106 may include suitable logic, circuitry, interfaces, and/or code that is configured to transmit the codeword (x) through the communication channel 108 to a receiver (e.g., a decoder). Examples of the transmitting unit 106 may include but are not limited to, transmitter, a sender, a transceiver, an encoder, and the like. The communication channel 108 corresponds to a channel that is used as an intermediator between the apparatus 102 and the receiver (e.g., a decoder).

The memory 110 may include suitable logic, circuitry, and/or interfaces that are configured to hold the information word (u). Examples of implementation of the memory 110 may include, but are not limited to, Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

In accordance with an embodiment, the processing unit 104 is configured to receive a message that includes K bits, with K<N, and form the information word (u) by storing the K bits of the message in the information word (u) according to an information set of size K and padding the information word (u) with N-K padding values. Firstly, the processing unit 104 is configured to receive the message (e.g., m) that includes K bits (or code dimension). After that, the processing unit 104 is configured to form the information word (u) of size N (or code length) by storing the K bits of the message in the information word (u) according to an information set of size K. In an implementation, the information word (u) of size N is generated by the message of K bits in the entries of the information word (u) listed in an information set I, while the remaining entries of the information word (u) are put to zero. In addition, the processing unit 104 is further configured for padding the information word (u) with N-K padding values, with K<N, as there is no other constraint on the choice of such elements, which can be chosen at random or according to the desired design principle. In an implementation, the size N of the information word (u) is not a prime number, and has few small factors, while the K bits have no constraint.

In operation, the processing unit 104 is configured to initialize a current vector as being the information word (u), and run T times a loop, T being a predetermined integer greater or equal to 1. The processing unit 104 is further configured to run the loop to generate a scrambled vector by interleaving values of the current vector, and grouping values of the scrambled vector into N/m input vectors of size m, where m≥2 and m divide N. The loop further includes multiplying each of the input vectors by an encoding matrix of size m×m to obtain output vectors and setting the current vector with a concatenation of the output vectors. Firstly, the processing unit 104 of the apparatus 102 is configured to initialize the current vector as being the information word (u) and run the loop for T times, and T is a predetermined integer greater or equal to 1. Moreover, the choice of predetermined integer T is more subtle, and a smaller value of T is preferable to achieve a low encoding latency. The processing unit 104 is configured to initialize the loop to generate the scrambled vector by interleaving values of the current vector of the information word (u). In an implementation, bits in the information word (u) are scrambled by an interleaver. The processing unit 104 is further configured to group the values of the scrambled vector into N/m input vectors of size m, where m≥2 and m divide N. After that, the processing unit 104 is configured to multiply each of the input vectors by the encoding matrix (e.g, P matrix) of size m×m to obtain the output vectors. Moreover, bits in the information word (u) are scrambled firstly by the interleaver, and then scrambled bits are multiplied in blocks by the encoding matrix (e.g., P matrix). After that, the processing unit 104 is configured to set the current vector with the concatenation of the output vectors. In an example, resulting bits are fed back to the interleaver again, and the interleaver or the encoding matrix, and steps are repeated in the loop for T times.

In accordance with an embodiment, the encoding matrix is an invertible binary matrix. In other words, the encoding matrix of size m×m is the invertible binary matrix, which is beneficial to perform parallel encoding. In such an embodiment, the encoding matrix is an involutive matrix. Optionally, due to a desired involutory property of the encoding matrix, the encoding matrix corresponds to the involutive matrix. Therefore, an inverse of the encoding matrix is equivalent to the encoding matrix presented at an encoder of the apparatus 102. In such embodiments, the encoding matrix is the 2×2 polar kernel $$\begin{bmatrix} 1 & 0 \\ 1 & 1 \end{bmatrix}.$$

In an example, if the value of m is two for the encoding matrix of size m×m, then the encoding matrix is the 2×2 polar kernel $$\begin{bmatrix} 1 & 0 \\ 1 & 1 \end{bmatrix}.$$

In an example, the polar kernel is also referred to as a polar matrix that has a polar code, such as random linear codes. The 2×2 polar kernel is beneficial to find an optimal value of T, so as to reduce encoding redundancy of the apparatus 102.

In an implementation, as the encoding matrix is the 2×2 polar kernel, then density $d_T$ of code generator matrix $G=(\Pi\cdot(J_{N/2}\otimes P))^T$ can be approximated by a recursive function, as shown below in equation (1).

$$d_T = d_{T-1} \cdot \left( \frac{3}{2} - d_{T-1} \right) \qquad (1)$$

This represents a generalization of the logistic map, and its solution (e.g., for non-chaotic cases) can be approximated by a sigmoid function in the form, as shown below in equation (2).

$$f(t) = \frac{1}{2} \cdot \frac{1}{1 + e^{k \cdot (r-t)}} \qquad (2)$$

Parameter r of the sigmoid function represents a horizontal shift from the axis origin, as a consequence, T≃2r is a good approximation of the expected number of cycles required for G to reach ½ density. After some algebraic calculation, parameter r can be estimated as shown below in equation (3).

$$r = \frac{2a_1 - a_2}{a_1 - a_2} \qquad (3)$$

where $$a_i = \log\left( \frac{1 - 2d_i}{2d_i} \right) \qquad (4)$$

In an implementation, an (N, K) RLC is completely defined by the N bits, where N is even. Moreover, the (N, K) RLC is interleaver with permutation matrix H, parallel matrix encoders P, the information word (u), such as an information set I of K integers smaller than the size of the information word (u) (i.e., N) and the number T of cycles of the loop. Moreover, the encoding procedure is equivalent to matrix multiplication, as shown below in equation (5).

$$x = u \cdot \left( \prod \cdot \left( J_{N/2} \otimes P \right) \right)^T \qquad (5)$$

where x corresponds to the codeword (x), u corresponds to the information word (u), $J_{N/2}$ represents the identity matrix of size N/2, "0" represents the Kronecker product, P corresponds to the encoding matrix, and T is the predetermined integer greater or equal to 1.

There is further provided that the apparatus 102 further includes the transmitting unit 106 that is configured to transmit the codeword (x) through the communication channel 108, the codeword (x) is the last current vector in the loop. The encoding matrix terminates after T time repetitions of the loop (or after T number of cycles), and the resulting bits are stored in codeword (x). Moreover, the codeword (x) is the last current vector (e.g., the output vector) in the loop. After that, the codeword (x) is transmitted by the transmitting unit 106, and through the communication channel 108. In an example, the codeword (x) is transmitted to a decoder, where decoding is performed in a reverse manner to obtain the information word (u).

The apparatus 102 is beneficial for random linear coding (RLC) of the information word (u) of size N into the codeword (x), while reducing the encoding latency. The apparatus 102 further permits the creation of RLC codes with limited encoding latency, while providing a simple check function for Guessing Random Additive Noise Decoders (GRAND). In an implementation, the apparatus 102 for RLC of the information word (u) outcome state-of-the-art codes for wireless communication, and approaches improved performance with improved polar code.

Figure 2A:
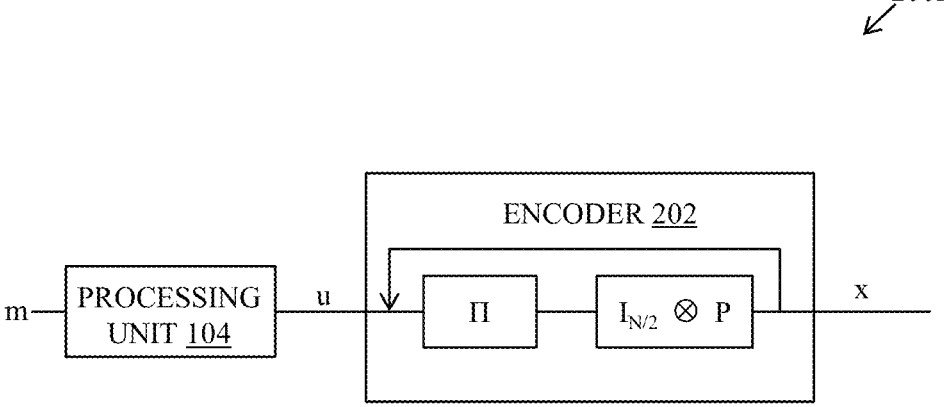
FIG. 2A is an illustration that depicts an apparatus for encoding, in accordance with an embodiment of the present disclosure.

FIG. 2A is an illustration that depicts an apparatus for encoding, in accordance with an embodiment of the present disclosure. FIG. 2A is described in conjunction with elements from FIG. 1A. With reference to FIG. 2A, there is shown an illustration 200A that includes an encoder 202, and the processing unit 104. The illustration 200A corresponds to the apparatus 102 of FIG. 1A.

In an embodiment, the processing unit 104 is configured to receive a message (m) that includes K bits. After that, the processing unit 104 is configured to form the information word (u) of size N (or code length) by storing the K bits of the message in the information word (u) according to an information set of size K. In addition, the processing unit 104 is further configured for padding the information word (u) with N-K padding values, with K<N, as there is no other constraint on the choice of such elements, which can be chosen at random or according to some desired design principle. In an implementation, the size N of the information word (u) is not a prime number, and has few small factors, while the K bits have no constraint. The information word (u) is further received by the encoder 202, which is configured to perform the encoding procedure via equation (5). In other words, the processing unit 104 is further configured to run the loop for T times to generate the scrambled vector by interleaving values of the current vector of the information word (u), and also to group the values of the scrambled vector into N/m input vectors of size m, where m≥2 and m divide N. After that, the processing unit 104 is configured to multiply each of the input vectors by the encoding matrix (P) of size m×m to obtain the output vectors. After that, the processing unit 104 is configured to set the current vector with the concatenation of the output vectors. After T time repetitions of the loop, encoding of the encoding matrix terminates after T number of cycles, and the resulting bits are stored in the codeword (x). After that, the codeword (x) is transmitted by the transmitting unit 106, and through the communication channel 108 (of FIG. 1).

Figure 2B:
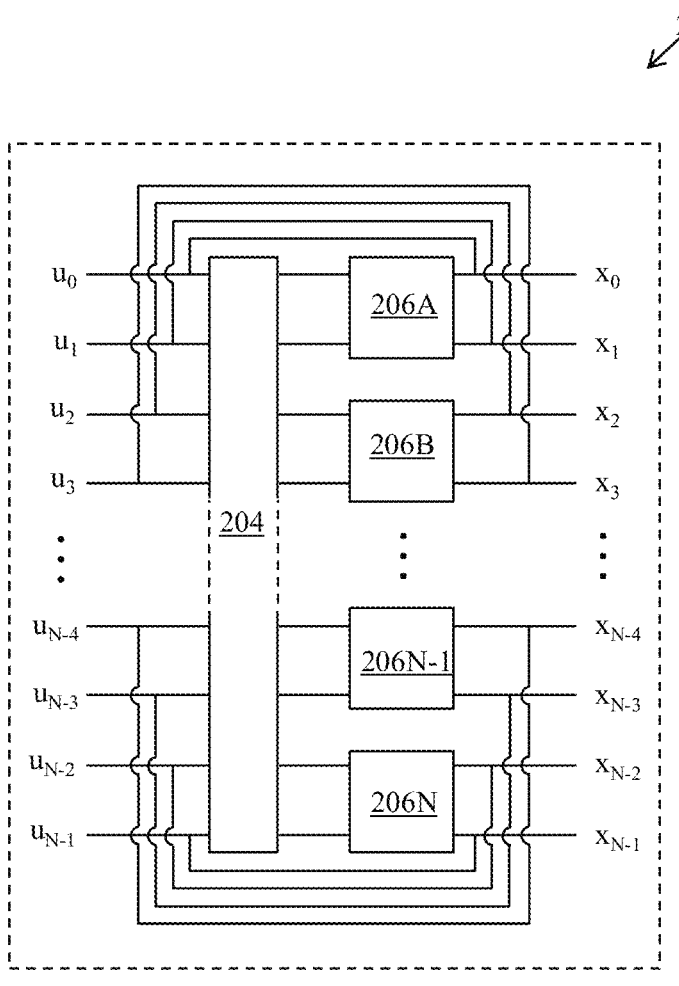
FIG. 2B is an illustration that depicts an encoder for encoding, in accordance with an embodiment of the present disclosure.

FIG. 2B is an illustration that depicts an encoder for encoding, in accordance with an embodiment of the present disclosure. FIG. 2B is described in conjunction with elements from FIGS. 1A and 2A. With reference to FIG. 2A, there is shown an illustration 200B of the encoder 202, the encoder 202 includes an interleaver 204, and encoding matrices 206A to 206N.

In an implementation, the information word (u) of size N is generated by the message of K bits in the entries of the information word (u) listed in an information set I, while the remaining entries of the information word (u) are put to zero. For example, information word ($u_0$) to information word ($u_{N-1}$) are generated by the message of K bits. The information word ($u_0$) to information word ($u_{N-1}$) is further received by the interleaver 204. After that, the interleaver 204 is used by the processing unit 104 for interleaving values of the current vector of the information word ($u_0$) to information word ($u_{N-1}$), and generates the scrambled vector. In addition, the processing unit 104 is further configured for padding the information word ($u_0$) to information word ($u_{N-1}$) with N-K padding values, with K<N. The processing unit 104 is further configured to group the values of the scrambled vector into N/m input vectors of size m, where m≥2 and m divide N. After that, the processing unit 104 is configured to multiply each of the input vectors by the encoding matrix (P) of size m×m to obtain the output vectors. For example, an encoding matrix 206A is used for information word ($u_0$) and information word ($u_1$), and set current vector with a concatenation of the output vectors. Moreover, after T times repetition of the loop, a last current vector in the loop is referred to as the codeword (x).

In accordance with an embodiment, the encoding matrix used at least in one of the runs of the loop and for multiplying at least one of the input vectors in said run of the loop, is different than the encoding matrix used at least in another one of the runs of the loop for multiplying at least one of the input vectors in said another one run of the loop. In an implementation, the encoding matrix is generated by alternating the interleaver and a series of parallel matrix encoders. In an example, the encoding matrix is always the same for each step of the loop, and for T times. In another example, the encoding matrix uses different matrix encoders in the encoding structure for each step of the loop, and for T times. For example, the encoding matrix 206A is used at least in one of the runs of the loop and for multiplying at least one of the input vectors in said run of the loop and an encoding matrix 206B is used at least in another one of the runs of the loop for multiplying at least one of the input vectors in said another one run of the loop. Moreover, the first encoding matrix 206A is different from the second encoding matrix 206B. Further, once the values of the current vector are passed through the interleaver and the encoding matrix, the input bits are fed back to the interleaver, and another cycle of interleaving and parallel matrix encoding is performed by the encoding matrix. In such embodiments, the encoding matrix used, for at least at one of the runs of the loop, to multiply at least one of the input vectors, is different than the encoding matrix used for multiplying at least another one of the input vectors in the said one of the runs of the loop. For example, the encoding matrix 206A is used for at least at one of the runs of the loop, to multiply at least one of the input vectors, and the encoding matrix 206B is used for multiplying at least another one of the input vectors in the said one of the runs of the loop. Moreover, the first encoding matrix is different from the second encoding matrix.

FIG. 3 is a flowchart of a method for encoding an information word (u) of size N into a codeword (x), in accordance with an embodiment of the present disclosure. FIG. 3 is described in conjunction with elements from FIGS. 1A, 2A, and 2B. With reference to FIG. 3 there is shown a flowchart of a method 300 for encoding an information word (u) of size N into a codeword (x). The method 300 includes steps 302 to 306.

The method 300 is used for encoding the information word (u) of size N into the codeword (x) to be transmitted through the communication channel 108. The method 300 is used to generate random linear codes (RLC) encoding for Guessing Random Additive Noise Decoders (GRAND).

In accordance with an embodiment, the method 300 includes receiving a message comprising K bits, with K<N, and forming the information word (u) by storing the K bits of the message in the information word (u) according to an information set of size K and padding the information word (u) with N-K padding values. Firstly, the method 300 includes receiving the message (e.g., m) that includes K bits (or code dimension). After that, the method 300 includes forming the information word (u) of size N (or code length) by storing the K bits of the message in the information word (u) according to an information set of size K. In an implementation, the information word (u) of size N is generated by the message of K bits in the entries of the information word (u) listed in an information set I, while the remaining entries of the information word (u) are put to zero. In addition, the method 300 includes padding the information word (u) with N-K padding values, with K<N, as there is no other constraint on the choice of such elements, which can be chosen at random or according to some desired design principle. In an implementation, the size N of the information word (u) is not a prime number, and has few small factors, while the K bits have no constraint.

At step 302, the method 300 includes initializing a current vector as being the information word (u). Firstly, the method 300 includes initializing the current vector, such as the current vector is the information word (u).

At step 304, the method 300 includes running T times, with T being predetermined and greater or equal to 1, a loop. In other words, the method 300 includes running the loop for T times, and T being a predetermined integer greater or equal to 1. Moreover, the choice of predetermined integer T is more subtle, and a smaller value of T is preferable to achieve a low encoding latency. The step 304 is further divided into four steps, such as a step 304A, a step 304B, a step 304C, and a step 304D.

At step 304A, the method 300 includes, running T times the loop, and the loop includes generating a scrambled vector by interleaving the values of the current vector. The loop is initialized to generate the scrambled vector by interleaving values of the current vector of the information word (u). In an implementation, bits in the information word (u) are scrambled by an interleaver.

At step 304B, the method 300 includes, grouping the values of the scrambled vector into N/m input vectors of size m, with m≥2 and m divides N. In an implementation, the processing unit 104 is used by the method 300 for grouping the values of the scrambled vector into N/m input vectors of size m, where m≥2 and m divide N.

At step 304C, the method 300 includes, multiplying each of the input vectors by an encoding matrix of size m×m to obtain output vectors. In an implementation, the processing unit 104 is used by the method 300 for multiplying each of the input vectors by the encoding matrix (e.g., P matrix) of size m×m to obtain the output vectors. In other words, bits in the information word (u) are scrambled firstly by the interleaver, and then scrambled bits are multiplied in blocks by the encoding matrix (e.g., P matrix).

At step 304D, the method 300 includes, setting the current vector with the concatenation of the output vectors. In an example, resulting bits are fed back to the interleaver again, and the interleaver or the encoding matrix, and steps are repeated in the loop for T times.

In accordance with an embodiment, the encoding matrix is an invertible binary matrix. In other words, the encoding matrix of size m×m is the invertible binary matrix, which is beneficial to perform parallel encoding. In such an embodiment, the encoding matrix is an involutive matrix. Optionally, due to a desired involutory property of the encoding matrix, the encoding matrix corresponds to the involutive matrix. Therefore, an inverse of the encoding matrix is equivalent to the encoding matrix presented at the encoder of the apparatus 102. In such embodiments, the encoding matrix is the 2×2 polar kernel $$\begin{bmatrix} 1 & 0 \\ 1 & 1 \end{bmatrix}.$$

In an example, if the value of m is two for the encoding matrix of size m×m, then the encoding matrix is the 2×2 polar kernel $$\begin{bmatrix} 1 & 0 \\ 1 & 1 \end{bmatrix}.$$

In an example, the polar kernel is also referred as a polar matrix that has a polar code, such as random linear codes. The 2×2 polar kernel is beneficial to find an optimal value of T, so as to reduce encoding redundancy of the apparatus 102.

At step 306, the method 300 includes, transmitting the codeword (x) through the communication channel 108 being the last current vector in the loop. The encoding of the encoding matrix terminates after T time repetitions of the loop (or T number of cycles), and the resulting bits are stored in codeword (x). Moreover, the codeword (x) is the last current vector (e.g., the output vector) in the loop. After that, the codeword (x) is transmitted by the transmitting unit 106, and through the communication channel 108. In an example, the codeword (x) is transmitted to a decoder, where decoding is performed in a reverse manner to obtain the information word (u), as further shown and described in FIG. 6.

In accordance with another embodiment, the encoding matrix used at least in one of the runs of the loop to multiply at least one of the input vectors in said one of the runs of the loop is different than the encoding matrix used at least in another one of the runs of the loop to multiply at least one of the input vectors of said another one of the runs of the loop. In an implementation, the method includes alternating the interleaver and a series of parallel matrix encoders, such as the encoding matrix. In an example, the encoding matrix is always the same for each step of the loop, and for T times. In another example, the encoding matrix uses different matrix encoders in the encoding structure for each step of the loop, and for T times. For example, the encoding matrix 206A is used at least in one of the runs of the loop and for multiplying at least one of the input vectors in said run of the loop and an encoding matrix 206B is used at least in another one of the runs of the loop for multiplying at least one of the input vectors in said another one run of the loop. Moreover, the first encoding matrix 206A is different from the second encoding matrix 206B. Further, once the values of the current vector are passed through the interleaver and the encoding matrix, the input bits are fed back to the interleaver, and another cycle of interleaving and parallel matrix encoding is performed by the encoding matrix. In such embodiment, for at least at one of the runs of the loop, the encoding matrix used to multiply at least one of the input vectors is different than the encoding matrix used to multiply at least another one of the input vectors in the said one of the runs of the loop. For example, the encoding matrix 206A is used for at least at one of the runs of the loop, to multiply at least one of the input vectors, and the encoding matrix 206B is used for multiplying at least another one of the input vectors in the said one of the runs of the loop. Moreover, the first encoding matrix is different from the second encoding matrix.

The method 300 is beneficial for random linear coding (RLC) of the information word (u) of size N into the codeword (x) while reducing the encoding latency. The method 300 further permits for the creation of RLC codes with limited encoding latency, while providing a simple check function for Guessing Random Additive Noise Decoders (GRAND). In an implementation, the method 300 for RLC of the information word (u) outcome state-of-the-art codes for wireless communication, and approaches improved performance with improved polar code.

The steps 302 to 306 are only illustrative, and other alternatives can also be provided where one or more steps are added, one or more steps are removed, or one or more steps are provided in a different sequence without departing from the scope of the claims herein.

Figure 4:
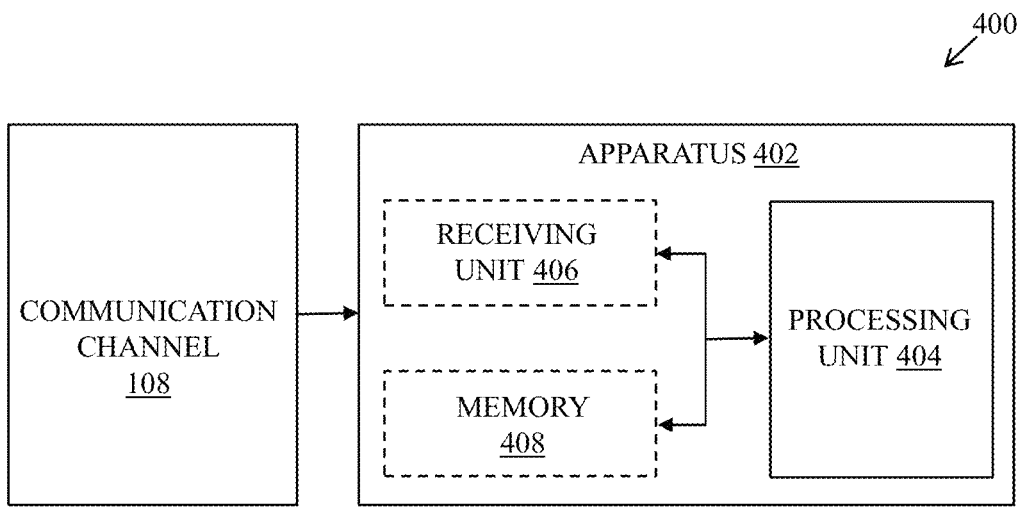
FIG. 4 is a block diagram of an apparatus to decode a symbol vector (y) received through a communication channel into a decoded codeword (x), in accordance with an embodiment of the present disclosure.

FIG. 4 is a block diagram of an apparatus to decode a symbol vector (y) received through a communication channel into a decoded codeword (x), in accordance with an embodiment of the present disclosure. With reference to FIG. 4, there is shown an apparatus 402 to decode a symbol vector (y) received through a communication channel into a decoded codeword (x). The apparatus 402 includes a processing unit 404, a receiving unit 406, and a memory 408. There is further shown the communication channel 108.

The apparatus 402 is used to decode a symbol vector (y) received through the communication channel 108 into a decoded codeword (x) of size N associated with an information set of size K, with K<N. The apparatus 402 includes the processing unit 404. The apparatus 402 is used for Guessing Random Additive Noise Decoders (GRAND) decoding.

The processing unit 404 may include suitable logic, circuitry, interfaces, and/or code that are configured to initialize to initialize an error vector. Examples of implementation of the processing unit 404 may include but are not limited to a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry.

The receiving unit 406 may include suitable logic, circuitry, interfaces, and/or code that is configured to receive a symbol vector (y) through the communication channel 108. Examples of the receiving unit 406 may include but are not limited to, receiver, a decoder, a transceiver, and the like.

The memory 408 may include suitable logic, circuitry, and/or interfaces that are configured to hold the information word (u). Examples of implementation of the memory 408 may include, but are not limited to, Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

In operation, the apparatus 402 is configured to decode a symbol vector (y) received through the communication channel 108 into a decoded codeword (x) of size N associated with an information set of size K, with K<N. The apparatus 402 includes the processing unit 404 that is configured to extract a hard decision vector from the symbol vector (y), to initialize an error vector, and to run a decoding loop. The decoding loop includes generating a candidate codeword by adding the error vector to the hard decision vector, initializing a current codeword as the candidate codeword, and running T times, with T being predetermined and greater or equal to 1, a backward encoding loop. Firstly, the receiving unit 406 of the apparatus 402 is configured to receive the symbol vector (y) through the communication channel 108. Thereafter, the processing unit 404 is configured to extract the hard decision (i.e., x) vector from the symbol vector (y), which is further used by the processing unit 404 to initialize the error vector (i.e., e), and to run the decoding loop. Moreover, the processing unit 404 is configured to add the error vector (i.e., e) to the hard decision vector to generate the candidate codeword $\hat{x}+e$, as further shown and described in FIG. 6. In another word, the hard decision vector (i.e., $\hat{x}$) is added to the error vector (i.e., e) to obtain the candidate codeword $\hat{x}+e$. After that, the processing unit 404 initializes the current codeword as the candidate codeword, and runs the backward encoding loop for T times, with T is predetermined and greater or equal to 1. Moreover, the choice of predetermined integer T is more subtle, and a smaller value of T is preferable to achieve a low decoding latency The backward encoding loop further includes, grouping the values of the current codeword into N/m input vectors of size m, with m≥2 and m divides N, and multiplying each of the input vectors by a decoding matrix of size m×m to obtain output vectors, and concatenating the obtained output vectors. In other words, values of the current codeword are grouped into the N/m input vectors of size m, with m≥2 and m divides N. Thereafter, the processing unit 404 is configured to multiply the decoding matrix of size m×m with each of the N/m input vectors to obtain the output vectors. Thereafter, the processing unit 404 is configured to concatenate the output vectors. The backward encoding loop further includes generating a scrambled vector by interleaving the values of the concatenated output vectors and setting the current codeword as being the scrambled vector. The processing unit 404 is further configured to interleave the values of the concatenated output vectors to generate the scrambled vector. In an implementation, the values of the concatenated output vectors are interleaved by an interleaver. After that, the processing unit 404 is configured to set the current codeword as the scrambled vector.

Moreover, the decoding loop includes, checking the entries in the last current codeword in the backward encoding loop outside of the information set. Further, if at least one of said entries is not zero, then change the error vector and start running further the decoding loop with the changed error vector, otherwise, stop the decoding loop and set the decoded codeword as being the last current codeword in the backward encoding loop. The processing unit 404 is configured to check if the entries in the last current codeword in the backward encoding loop are outside of the information set. Moreover, if the at least one of said entries is not zero, then the processing unit 404 is configured to change the error vector of the decoding loop. In an implementation, the error vector is again added to the hard decision vector to generate the candidate codeword. However, if the at least one of said entries is zero, then the processing unit 404 is configured to stop the decoding loop. After that, the processing unit 404 is configured to set the decoded codeword as the last current codeword in the backward encoding loop. In an implementation, the last current codeword corresponds to the decoded codeword (x) of size N associated with an information set of size K, with K<N.

In accordance with an embodiment, the decoding matrix is an invertible binary matrix. In other words, the decoding matrix of size m×m is the invertible binary matrix, which is beneficial to perform parallel encoding. In such embodiment, the decoding matrix is an involutive matrix. Optionally, due to a desired involutory property of the decoding matrix, the decoding matrix corresponds to the involutive matrix. Therefore, an inverse of the decoding matrix is equivalent to the decoding matrix presented at a decoder of the apparatus 402. In such embodiment, the decoding matrix is the inverse of the 2×2 polar kernel $$\begin{bmatrix} 1 & 0 \\ 1 & 1 \end{bmatrix}.$$

In an example, if the value of m is two for the encoding matrix of size m×m, then the decoding matrix is the inverse of the 2×2 polar kernel $$\begin{bmatrix} 1 & 0 \\ 1 & 1 \end{bmatrix}.$$

The 2×2 polar kernel is beneficial to find an optimal value of T, so as to reduce decoding redundancy of the apparatus 402.

In accordance with an embodiment, the decoding matrix used, at least in one of the runs of the backward encoding loop of at least one of the runs of the decoding loop, for multiplying at least one of the input vectors in said run of the backward encoding loop, is different than the decoding matrix used at least in another one of the runs of the backward encoding loop of said at least one of the runs of the decoding loop, for multiplying at least one of the input vectors in said another one of the runs of the backward encoding loop. In an implementation, the decoding matrix is generated by alternating the interleaver and a series of parallel matrix decoders. In an example, the decoding matrix uses different matrix decoders in the decoding structure for each step of the backward encoding loop. For example, a first decoding matrix is used at least in one of the runs of the backward encoding loop of at least one of the runs of the decoding loop, for multiplying at least one of the input vectors in a run of the backward encoding loop. Moreover, a second decoding matrix is used at least in another one of the runs of the backward encoding loop of said at least one of the runs of the decoding loop, for multiplying at least one of the input vectors in said another one of the runs of the backward encoding loop. In such embodiment, the decoding matrix used, for at least at one of the runs of the backward encoding loop of at least one of the runs of the decoding loop, to multiply at least one of the input vectors in said run of the backward encoding loop, is different than the decoding matrix used for multiplying at least another one of the input vectors in the said run of the backward encoding loop. For example, the first decoding matrix is used for at least one of the runs of the backward encoding loop of at least one of the runs of the decoding loop, to multiply at least one of the input vectors in the run of the backward encoding loop. Moreover, the second decoding matrix is used for multiplying at least another one of the input vectors in the said run of the backward encoding loop. Further, the first decoding matrix is different from the second decoding matrix.

In accordance with an embodiment, the decoding matrix used for multiplying at least one input vector in at least one run of the backward encoding loop in at least one run of the decoding loop is different than the decoding matrix used for multiplying at least one input vector in at least one run of the backward encoding loop in another run of the decoding loop. For example, the first decoding matrix is used for multiplying at least one input vector in at least one run of the backward encoding loop in at least one run of the decoding loop. Further, the second decoding matrix is used for multiplying at least one input vector in at least one run of the backward encoding loop in another run of the decoding loop. Moreover, the first decoding matrix is different from the second decoding matrix.

The apparatus 402 is beneficial for decoding a symbol vector (y) received through a communication channel into a decoded codeword (x) of size N while reducing the decoding latency. The apparatus 402 further permits for the creation of RLC codes with limited decoding latency, while providing a simple check function for Guessing Random Additive Noise Decoders (GRAND).

FIG. 5 is a flowchart of a method for decoding a symbol vector (y) received through a communication channel into a decoded codeword (x), in accordance with an embodiment of the present disclosure. FIG. 5 is described in conjunction with elements from FIG. 4. With reference to FIG. 5 there is shown a flowchart of a method 500 for decoding a symbol vector (y) received through a communication channel into a decoded codeword (x). The method 500 includes steps 502 to 506.

The method 500 is used for decoding a symbol vector (y) received through the communication channel 108 into a decoded codeword (x) of size N associated with an information set of size K, with K<N. The method 500 includes extracting a hard decision vector from the symbol vector, initializing an error vector, and running a decoding loop. Firstly, the method 500 includes, using the receiving unit 406 for receiving the symbol vector (y) through the communication channel 108. Thereafter, the method 500 includes, extracting the hard decision vector from the symbol vector (y), which is further used by the processing unit 404 to initialize the error vector, and to run the decoding loop.

At step 502, the method 500 includes, generating a candidate codeword by adding the error vector to the hard decision vector. In other words, the method 500 includes using the processing unit 404 for adding the error vector to the hard decision vector to generate the candidate codeword.

At step 504, the method 500 includes, initializing a current codeword as being the candidate codeword, and running T times, with T being predetermined and greater or equal to 1, a backward encoding loop. In other words, the method 500 includes using the processing unit 404 for initializing the current codeword as the candidate codeword, and running the backward encoding loop for T times, with T is predetermined and greater or equal to 1. Moreover, the choice of predetermined integer T is more subtle, and a smaller value of T is preferable to achieve a low decoding latency. The step 504 further includes 504A to 504D.

At step 504A, the method 500 includes, grouping the values of the current codeword into N/m input vectors of size m, with m≥2 and m divides N. In other words, method 500 includes using the processing unit 404 for grouping the values of the current codeword into the N/m input vectors of size m, with m≥2 and m divides N.

At step 504B, the method 500 includes, multiplying each of the input vectors by a decoding matrix of size m×m to obtain output vectors, and concatenating the obtained output vectors. In other words, the method 500 includes using the processing unit 404 for multiplying the decoding matrix of size m×m with each of the N/m input vectors to obtain the output vectors. Thereafter, the method 500 includes using the processing unit 404 for concatenating the output vectors.

At step 504C, the method 500 includes, generating a scrambled vector by interleaving the values of the concatenated output vectors. The method 500 includes using the processing unit 404 for interleaving the values of the concatenated output vectors to generate the scrambled vector. In an implementation, the values of the concatenated output vectors are interleaved by an interleaver.

At step 504D, the method 500 includes, setting the current codeword as being the scrambled vector. In an implementation, the method 500 includes using the processing unit 404 for setting the current codeword as the scrambled vector.

At step 506, the method 500 includes, checking the entries in the last current codeword in the backward encoding loop outside of the information set, and if at least one of said entries is not zero, changing the error vector and starting running further the decoding loop with the changed error vector, otherwise, stopping the decoding loop and setting the decoded codeword as being the last current codeword in the backward encoding loop. The method 500 includes checking if the entries in the last current codeword in the backward encoding loop are outside of the information set. Moreover, if the at least one of said entries is not zero, then the method 500 includes changing the error vector of the decoding loop. However, if the at least one of said entries is zero, then the method 500 includes stopping the decoding loop. After that, the method 500 includes setting the decoded codeword (x) as the last current codeword in the backward encoding loop. In an implementation, the last current codeword corresponds to the decoded codeword (x) of size N associated with an information set of size K, with K<N.

In accordance with an embodiment, the decoding matrix is an invertible binary matrix. In other words, the decoding matrix of size m×m is the invertible binary matrix, which is beneficial to perform parallel encoding. In such embodiment, the decoding matrix is an involutive matrix. Optionally, due to a desired involutory property of the decoding matrix, the decoding matrix corresponds to the involutive matrix. Therefore, an inverse of the decoding matrix is equivalent to the decoding matrix presented at a decoder of the apparatus 402. In such embodiment, the decoding matrix is the inverse of the 2×2 polar kernel $$\begin{bmatrix} 1 & 0 \\ 1 & 1 \end{bmatrix}.$$

In an example, if the value of m is two for the encoding matrix of size m×m, then the decoding matrix is the inverse of the 2×2 polar kernel $$\begin{bmatrix} 1 & 0 \\ 1 & 1 \end{bmatrix}.$$

The 2×2 polar kernel is beneficial to find an optimal value of T, so as to reduce decoding redundancy of the apparatus 402.

In accordance with another embodiment, the decoding matrix used in at least in one of the runs of the backward encoding loop of at least one of the runs of the decoding loop, for multiplying at least one of the input vectors in said run of the backward encoding loop, is different than the decoding matrix used at least in another one of the runs of the backward encoding loop of said at least one of the runs of the decoding loop, for multiplying at least one of the input vectors in said another one of the runs of the backward encoding loop. In an implementation, the decoding matrix is generated by alternating the interleaver and a series of parallel matrix decoders. In an example, the decoding matrix uses different matrix decoders in the decoding structure for each step of the backward encoding loop. For example, a first decoding matrix is used at least in one of the runs of the backward encoding loop of at least one of the runs of the decoding loop, for multiplying at least one of the input vectors in a run of the backward encoding loop. Moreover, a second decoding matrix is used at least in another one of the runs of the backward encoding loop of said at least one of the runs of the decoding loop, for multiplying at least one of the input vectors in said another one of the runs of the backward encoding loop. In such embodiment, the decoding matrix used, for at least at one of the runs of the backward encoding loop of at least one of the runs of the decoding loop, to multiply at least one of the input vectors in said run of the backward encoding loop, is different than the decoding matrix used for multiplying at least another one of the input vectors in the said run of the backward encoding loop. For example, the first decoding matrix is used for at least one of the runs of the backward encoding loop of at least one of the runs of the decoding loop, to multiply at least one of the input vectors in the run of the backward encoding loop. Moreover, the second decoding matrix is used for multiplying at least another one of the input vectors in the said run of the backward encoding loop. Further, the first decoding matrix is different from the second decoding matrix.

In accordance with another embodiment, the decoding matrix used for multiplying at least one input vector in at least one run of the backward encoding loop in at least one run of the decoding loop is different than the decoding matrix used for multiplying at least one input vector in at least one run of the backward encoding loop in another run of the decoding loop. For example, the first decoding matrix is used for multiplying at least one input vector in at least one run of the backward encoding loop in at least one run of the decoding loop. Further, the second decoding matrix is used for multiplying at least one input vector in at least one run of the backward encoding loop in another run of the decoding loop. Moreover, the first decoding matrix is different from the second decoding matrix.

The method 500 is beneficial for decoding a symbol vector (y) received through a communication channel into a decoded codeword (x) of size N while reducing the decoding latency. The method 500 further permits for the creation of RLC codes with limited decoding latency, while providing a simple check function for Guessing Random Additive Noise Decoders (GRAND).

The steps 502 to 506 are only illustrative, and other alternatives can also be provided where one or more steps are added, one or more steps are removed, or one or more steps are provided in a different sequence without departing from the scope of the claims herein.

There is further provided a computer program product comprising program code for performing the method 300 for encoding an information word (u) of size N and/or the method 500 for decoding a symbol vector (y), when executed by a processor in a computer system. In an example, the program code is implemented on a computer program product, which includes, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer-readable storage medium, and/or CPU cache memory. In an example, the program code is generated by the computer program product, which is implemented in view of the method 300 for encoding an information word (u) of size N, and for use in implementing the method 300 on the apparatus 102. In an example, the program code is generated by the computer program product, which is implemented in view of the method 500 for decoding a symbol vector (y), and for use in implementing the method 500 on the apparatus 402.

Figure 6:
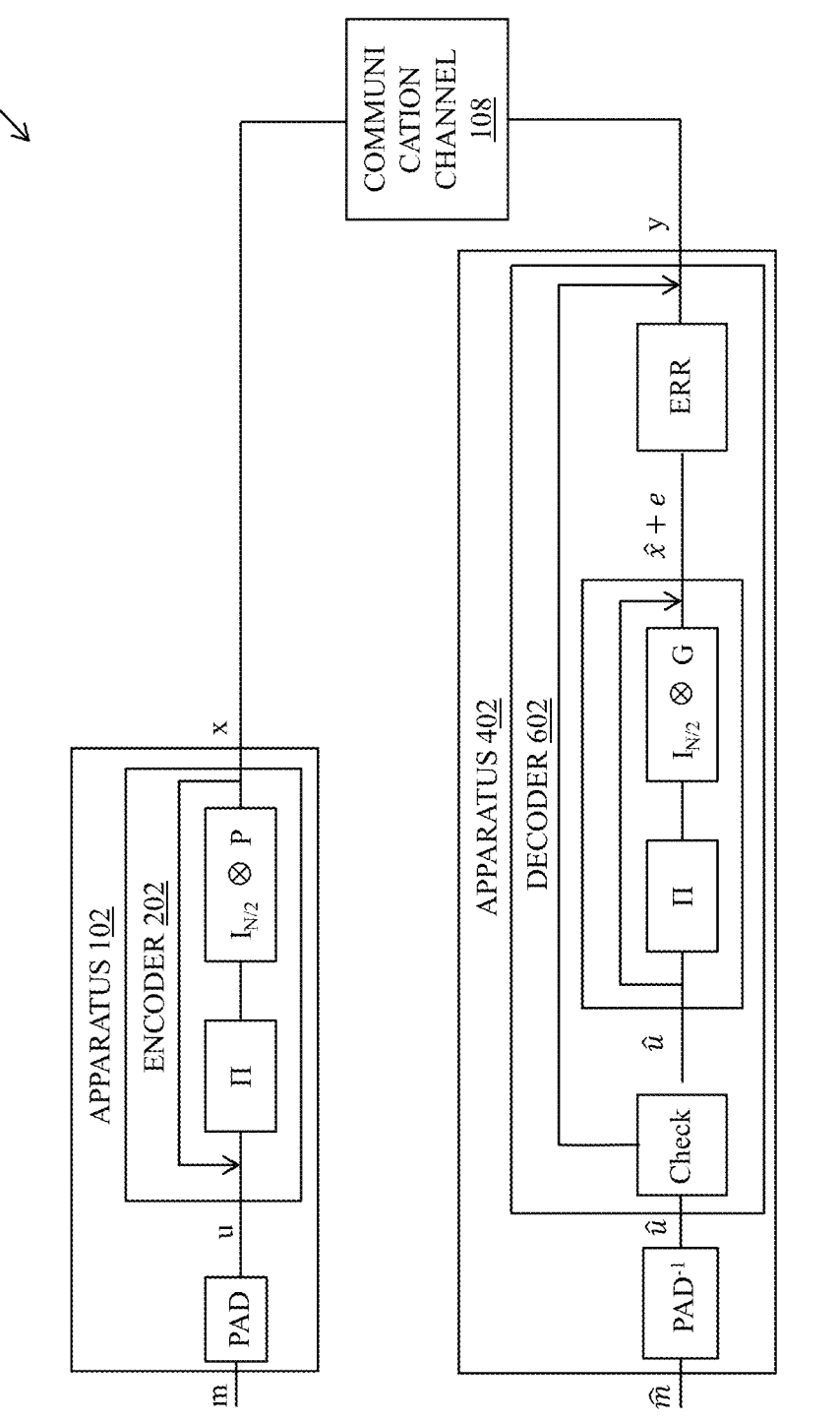
FIG. 6 is an illustration that depicts an encoding and decoding scheme through a communication channel, in accordance with an embodiment of the present disclosure.

FIG. 6 is an illustration that depicts an encoding and decoding scheme through a communication channel, in accordance with an embodiment of the present disclosure. FIG. 6 is described in conjunction with elements from FIGS. 1A, 2A, 2B, and 4. With reference to FIG. 6, there is shown an illustration 600 that depicts an encoding and decoding scheme through a communication channel. The illustration 600 includes the apparatus 102, the apparatus 402, and the communication channel 108. The apparatus 102 further includes the encoder 202. The apparatus 402 further includes a decoder 602.

In an implementation, the processing unit 104 of the apparatus 102 is configured to receive a message (m) that includes K bits, with K<N. The message (m) is used by the processing unit 104 to form the information word (u) by storing the K bits of the message (m) in the information word (u) according to an information set of size K. The processing unit 104 is further configured for padding the information word (u) with N-K padding values, through PAD, as shown in FIG. 6. The processing unit 104 is further configured to initialize a current vector as being the information word (u), run T times, T being a predetermined integer greater or equal to 1, a loop. The loop includes generating a scrambled vector by interleaving values of the current vector, and grouping values of the scrambled vector into N/m input vectors of size m, where m≥2 and m divide N. The loop further includes multiplying each of the input vectors by an encoding matrix of size m×m to obtain output vectors and setting the current vector with a concatenation of the output vectors. Thereafter, the transmitting unit 106 of the apparatus 102 is configured to transmit a codeword (x)

to the apparatus 402 through the communication channel 108, the codeword (x) is the last current vector in the loop. In an example, the output of the communication channel 108 is referred to as a symbol vector (y).

The symbol vector (y) is further received by the receiving unit 406 of the apparatus 402 through the communication channel 108. The apparatus 402 is further configured to decode the symbol vector (y) into a decoded codeword (x) of size N associated with an information set of size K, with K<N. The apparatus includes the processing unit 404 that is configured to extract a hard decision vector from the symbol vector, to initialize an error vector, and to run a decoding loop. The decoding loop includes generating a candidate codeword by adding the error vector to the hard decision vector, initializing a current codeword as being the candidate codeword, and running T times, with T being predetermined and greater or equal to 1, a backward encoding loop. The backward encoding loop includes grouping the values of the current codeword into N/m input vectors of size m, with m≥2 and m divides N, and multiplying each of the input vectors by a decoding matrix of size m×m to obtain output vectors, and concatenating the obtained output vectors. The backward encoding loop further includes generating a scrambled vector by interleaving the values of the concatenated output vectors and setting the current codeword as being the scrambled vector. The processing unit 404 is further configured to check the entries in the last current codeword in the backward encoding loop outside of the information set, and if at least one of said entries is not zero, changing the error vector and starting running further the decoding loop with the changed error vector, otherwise, stopping the decoding loop and setting the decoded codeword as being the last current codeword in the backward encoding loop.

In an implementation, the encode 202 (or RLC encoder) of the apparatus 102 is tailored to be used in conjunction with a GRAND-based decoder, such as the decoder 602 of the apparatus 402. Moreover, an encoding procedure applied backward can be used as a codeword check function, namely to check if a vector of bits calculated by the first step of GRAND decoding belongs to a codebook. Further, a hard decision vector (x̂) is extracted from the symbols vector (y), and an error vector (e) is added to the hard decisions (x̂), such as through ERR block of FIG. 6. As a result, a candidate codeword (x̂+e) is generated that needs to be checked in order to control if it belongs to a codebook (C). The check procedure is executed in two steps, such as by using the check box of FIG. 6. For example, at the first step, the encoder 202 is run backward, namely the candidate codeword (x̂+e) is given to the inverse of the parallel matrix encoders, and then to the interleaver, alternating these two blocks T times. Moreover, if P is involutory, then the inverse of the parallel matrix encoders is equivalent to the parallel matrix encoders presented at the encoder. After that, a candidate input vector (û) is retrieved and the second step of the check function consists of verifying if the entries of the candidate input vector (û) not belonging to the information set I are set to zero. Further, if all of them are zeroed, then decoding stops an û is the result of the decoding, otherwise u is discarded and a new candidate codeword (x̂+e') is calculated, as shown in FIG. 6.

Figure 7:
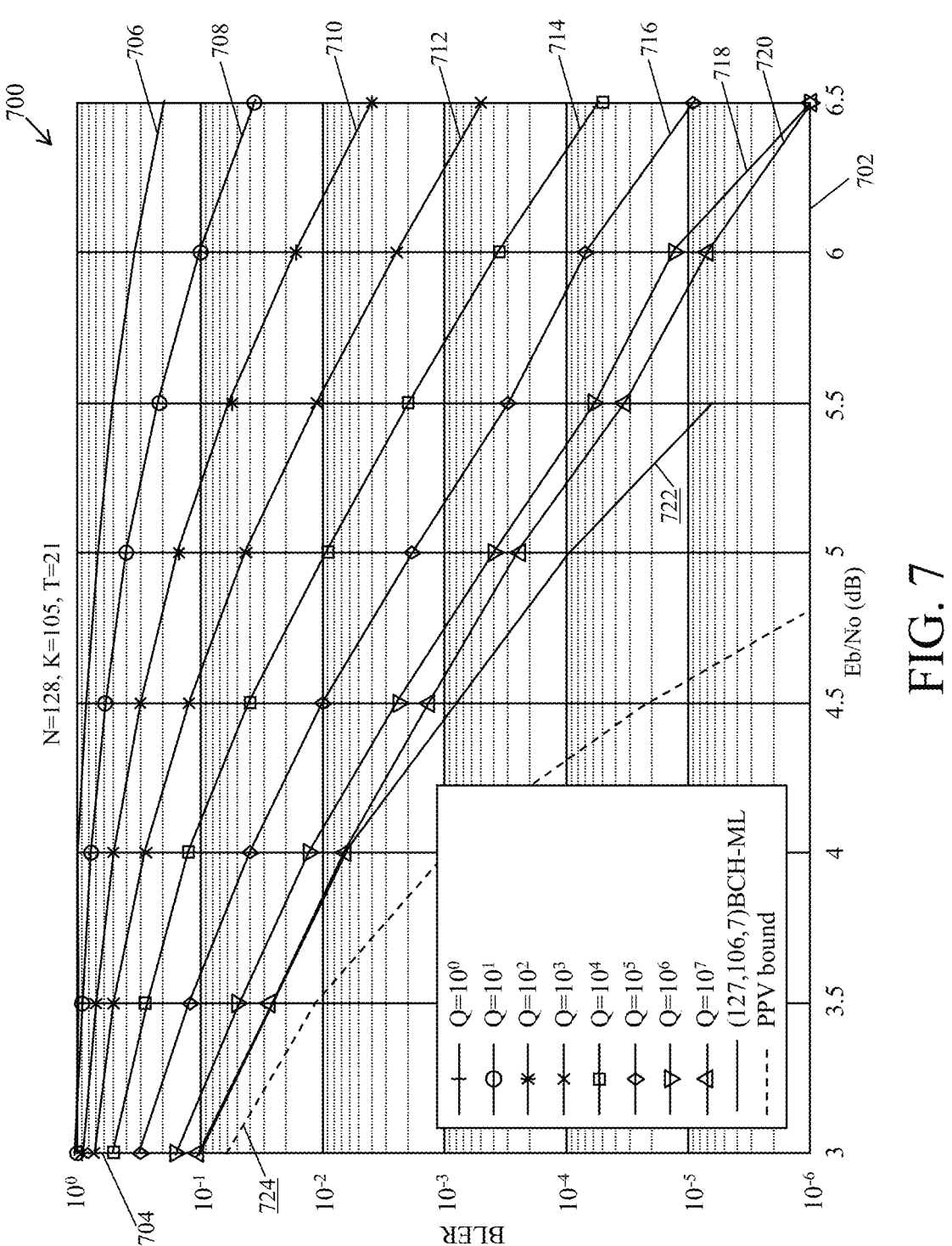
FIG. 7 is a graphical representation that illustrates a performance of random linear codes (RLC) design under guessing random additive noise decoders (GRAND) based decoding, in accordance with an embodiment of the present disclosure.

FIG. 7 is a graphical representation that illustrates the performance of random linear codes (RLC) design under guessing random additive noise decoders (GRAND) based decoding, in accordance with an embodiment of the present disclosure. FIG. 7 is described in conjunction with elements from FIGS. 1, 2A, 2B, 4, and 6. With reference to FIG. 7, there is shown a graphical representation 700 that includes a X-axis 702 that illustrates energy per bit to noise power spectral density ratio (i.e., Eb/No) in decibel (dB) and a Y-axis 704 that illustrates block error rate (BLER) performance. The graphical representation 700 illustrates block error rate (BLER) performance of the proposed RLC construction for a codeword (N=128, K=105, and T=21) under GRAND-based decoding. With reference to the graphical representation 700A, lines 706 to 720 collectively illustrate the different values of a maximum number of error patterns checks Q, such as from $Q=10^0$ to $10^7$. Moreover, a line 722 illustrates ML performance of (N=127, K=106, and T=7) BCH code, which is an optimal code with similar parameters, and a line 724 illustrates PPV bound. Simulation results of the graphical representation illustrate that proposed RLC encoder outcome state-of-the-art codes for wireless communication and approach ML performance of an improved code for different parameters.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. An apparatus, comprising:

at least one processor; and a non-transitory computer-readable medium including computer-executable instructions that, when executed by the at least one processor, cause the apparatus to carry out a method including:

initializing a current vector as being an information word of size N; and running T times, T being a predetermined integer greater than or equal to 1, a loop comprising:

generating a scrambled vector by interleaving values of the current vector;

grouping values of the scrambled vector into N/m input vectors of size m, where m≥2;

multiplying each of the input vectors by an encoding matrix of size m×m to obtain output vectors; and setting the current vector with a concatenation of the output vectors; and a transceiver configured to transmit a codeword through a communication channel, the codeword being a last current vector in the loop, wherein the codeword is a non-systematic random linear code codeword config-
ured for decoding by a Guessing Random Additive
Noise Decoder (GRAND).

2. The apparatus according to claim 1, wherein the
method further includes:
   receiving a message comprising K bits, with K<N; and
   forming the information word by storing the K bits of the
      message in the information word according to an
      information set of size K, and padding the information
      word with N-K padding values.

3. The apparatus according to claim 1, wherein the
encoding matrix is an invertible binary matrix.

4. The apparatus according to claim 1, wherein the
encoding matrix is an involutive matrix.

5. The apparatus according to claim 1, wherein the
encoding matrix is the following 2×2 polar kernel:

$$\begin{bmatrix} 1 & 0 \\ 1 & 1 \end{bmatrix}.$$

6. The apparatus according to claim 5, wherein the
encoding matrix used at least in a first run of the loop and
for multiplying at least one of the input vectors in the first
run of the loop, is different than the encoding matrix used at
least in a second run of the loop for multiplying at least one
of the input vectors in the second run of the loop.

7. The apparatus according to claim 1, wherein the
encoding matrix used, for at least at a first run of the loop,
to multiply at least a first one of the input vectors, is different
than the encoding matrix used for multiplying at least a
second one of the input vectors in the first run of the loop.

8. A method, comprising:
   initializing a current vector as being an information word
      of size N; and
   running T times, with T being predetermined and greater
      than or equal to 1, a loop comprising:
      generating a scrambled vector by interleaving values of
         the current vector;
      grouping values of the scrambled vector into N/m input
         vectors of size m, with m≥2;
      multiplying each of the input vectors by an encoding
         matrix of size m×m to obtain output vectors; and
      setting the current vector with a concatenation of the
         output vectors; and
   transmitting a codeword through a communication chan-
      nel, the codeword being a last current vector in the
      loop, wherein the codeword is a non-systematic ran-
      dom linear code codeword configured for decoding by
      a Guessing Random Additive Noise Decoder
      (GRAND).

9. The method according to claim 8, further comprising:
   receiving a message comprising K bits, with K<N; and
   forming the information word by storing the K bits of the
      message in the information word according to an
      information set of size K, and padding the information
      word with N-K padding values.

10. The method according to claim 9, wherein the encod-
ing matrix is an invertible binary matrix.

11. The method according to claim 8, wherein the encod-
ing matrix is an involutive matrix.

12. The method according to claim 11, wherein the
encoding matrix is the following 2×2 polar kernel:

$$\begin{bmatrix} 1 & 0 \\ 1 & 1 \end{bmatrix}.$$

13. The method according to claim 8, wherein the encod-
ing matrix used at least in a first run of the loop to multiply
at least one of the input vectors in the first run of the loop,
is different than the encoding matrix used at least in a second
run of the loop to multiply at least one of the input vectors
of the second run of the loop.

14. The method according to claim 8, wherein for at least
at a first run of the loop, the encoding matrix used to
multiply at least a first one of the input vectors is different
than the encoding matrix used to multiply at least a second
one of the input vectors in the first run of the loop.

15. An apparatus, comprising:
   at least one processor; and
   one or more memories coupled to the at least one pro-
      cessor, wherein the one or more memories store pro-
      gramming instructions for execution by the at least one
      processor to perform operations comprising:
      receiving a symbol vector through a communication
         channel, the symbol vector corresponding to a trans-
         mitted non-systematic random linear code code-
         word;
      extracting a hard decision vector from the symbol
         vector, to initialize an error vector;
      running a decoding loop comprising:
         generating a candidate codeword by adding the error
            vector to the hard decision vector;
         initializing a current codeword as being the candi-
            date codeword; and
         running T times, with T being predetermined and
            greater or equal to 1, a backward encoding loop
            comprising:
            grouping values of the current codeword into N/m
               input vectors of size m, with m≥2 and m divides
               N;
            multiplying each of the input vectors by a decoding
               matrix of size m×m to obtain output vectors, and
               concatenating the output vectors to obtain concat-
               enated output vectors;
            generating a scrambled vector by interleaving the
               values of the concatenated output vectors; and
            setting the current codeword as being the scrambled
               vector; and
         checking entries in the last current codeword in the
            backward encoding loop outside of an information
            set;
         in response to at least one of the entries in the last
            current codeword not being zero, changing the error
            vector and starting running further the decoding loop
            with the changed error vector; and
      in response to all of the entries in the last current code-
         word being zero, stopping the decoding loop and set-
         ting the last current codeword in the backward encod-
         ing loop as a decoded codeword, the decoded codeword
         being of size N associated with the information set of
         size K, K<N, wherein the decoding loop implements
         Guessing Random Additive Noise Decoding
         (GRAND).

16. The apparatus according to claim 15, wherein the
decoding matrix is an invertible binary matrix.

17. The apparatus according to claim 15, wherein the
decoding matrix is an involutive matrix.

18. The apparatus according to claim 15, wherein the
decoding matrix is an inverse of the following 2×2 polar
kernel:

$$\begin{bmatrix} 1 & 0 \\ 1 & 1 \end{bmatrix}.$$

19. The apparatus according to claim 15, wherein the decoding matrix used, at least in a first run of the backward encoding loop of at least one of the runs of the decoding loop, for multiplying at least one of the input vectors in the first run of the backward encoding loop, is different than the decoding matrix used at least in a second run of the backward encoding loop of said at least one of the runs of the decoding loop, for multiplying at least one of the input vectors in the second run of the backward encoding loop.

20. The apparatus according to claim 15, wherein the decoding matrix used, for at least at a first run of the backward encoding loop of at least one of the runs of the decoding loop, to multiply a first one of the input vectors in the first run of the backward encoding loop, is different than the decoding matrix used for multiplying at least a second one of the input vectors in the first run of the backward encoding loop.

* * * * *